United States Patent

Brown

[15] 3,671,585
[45] June 20, 1972

[54] CARBONYLATION OF ORGANOBORANES

[72] Inventor: Herbert C. Brown, 1840 Garden Street, West, Lafayette, Ind. 07906

[22] Filed: May 20, 1968

[21] Appl. No.: 730,654

[52] U.S. Cl. .................................260/545 R, 260/462 R
[51] Int. Cl. .....................................C07d 107/02
[58] Field of Search ................260/462, 462 A, 462 R, 545 R

[56] References Cited

UNITED STATES PATENTS

| | | | |
|---|---|---|---|
| 3,317,580 | 5/1967 | Hillman | 260/462 |
| 3,006,961 | 10/1961 | Reppe et al. | 260/606.5 B |

OTHER PUBLICATIONS

H. Steinberg, Organoboron Chemistry, Vol. 1, p. 443 (1964) (N.Y.)

Primary Examiner—Leon Zitver
Assistant Examiner—L. B. De Crescente
Attorney—Chasan and Sinnock and J. E. Luecke

[57] ABSTRACT

Organoboron derivatives of the general formula $R_3CBO$ and $(R_3CBO)_3$ are formed by reacting an organoborane compound with carbon monoxide in the substantial absence of water at pressures of less than about 5 atmospheres and at temperatures ranging from about 25° to about 200° C. The organoboron derivatives may be used as additives for gasoline and diesel fuels. More importantly, they may be oxidized to form tertiary alcohols of the formula $R_3COH$.

8 Claims, No Drawings

CARBONYLATION OF ORGANOBORANES

BACKGROUND OF THE INVENTION

1. Field of Invention

This invention relates to processes for the preparation of organoboron derivatives of the formula $R_3CBO$ and $(R_3CBO)_3$ and to the conversion of the organoboron derivatives so formed to tertiary monoalcohols. More particularly, this invention relates to the preparation of organoboron derivatives by reacting an organoborane with carbon monoxide at moderate conditions and to the oxidation of the organoboron derivatives to tertiary alcohols.

2. Description of the Prior Art

Various reactions of carbon monoxide with organoborane compounds have been attempted. For example, Reppe et al. in U.S. Pat. No. 3,006,961 disclose that organoboranes can be reacted with carbon monoxide to form "carbonyls" at temperatures of from 0° to 150° C and at pressures ranging from 5 to 500 atmospheres. The reaction contemplated by Reppe et al proceeds as follows:

$$n\, BR_1R_2R_3 + n\, CO \longrightarrow [(BR_1R_2R_3)CO]_n$$

As indicated by the formula for the product formed, the formation of the "carbonyls" does not involve the transfer of any of the organic groups ($R_1$, $R_2$, or $R_3$) from the boron atom to the carbon of the carbon monoxide.

Hillman, in U.S. Pat. No. 3,317,580, teaches that organoborane compounds can be reacted with carbon monoxide in the presence of substantial quantities of water in order to secure 2,5-diboradioxane compounds. One important reaction reported by Hillman proceeds according to the following equation:

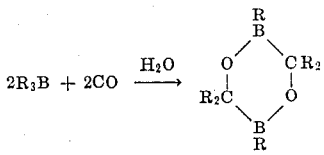

As can be seen, the Hillman et al. reactions involve the transfer of two of the three organo groups attached to the boron compound to the carbon of the carbon monoxide reactant.

SUMMARY OF THE INVENTION

In accordance with the present invention, organoboron derivatives of the formula $R_3CBO$ or $(R_3CBO)_3$ are produced by the reaction of an organoboron compound of the formula $R_3B$ with carbon monoxide at pressures of less than about 5 atmospheres and temperatures varying from about 25° to about 200° C. To effect the transfer of all three organo groups of the boron compound to the carbon atom of the carbon monoxide reactant, it is necessary that the reaction be conducted in the substantial absence of water. When the reaction is conducted in the presence of one or more moles of water per mole of organoboron compound, the reaction proceeds to the transfer of predominantly only two of the three organo groups bonded to the boron atom of the organoboron compound. The instant organoboron derivatives can subsequently be converted to tertiary monoalcohols of the formula

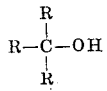

by oxidizing the organoboron derivatives under basic conditions.

The overall reactions contemplated by the instant invention are as follows:

(1) 

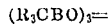
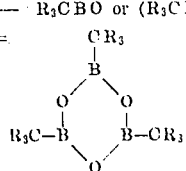

(II) 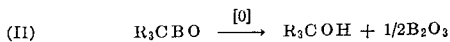

In general, reaction I consists of contacting a triorganoboron compound with carbon monoxide (normally a molar excess of CO) at moderate conditions and in the substantial absence of water to arrive at the organoboron derivatives. As is noted in Equation II the organoboron derivatives may subsequently be oxidized, preferably in the presence of an alkaline substance, to a tertiary monoalcohol and boron oxide. The starting organoboron compounds (borines) can be conveniently formed by reacting borane with a monoolefin according to known techniques (see, for example, U.S. Pat. Nos. 2,993,933; 3,078,308; 3,078,309; 3,078,310; 3,078,311; etc.). The organic moieties of borine compound (R) are most typically monovalent alkyl or aralkyl radicals. For example, R may be a straight chain, branched chain, monocyclic, or bicyclic alkyl or aralkyl radical having from two to 30, preferably from two to 10 carbon atoms. The expression "aralkyl" radical is intended to include monovalent alkyl radicals substituted with one or more aromatic radicals, e.g., phenyl or tolyl radicals. R of the triorgano boron compound may be the same or different hydrocarbon moiety. Hence, all three valences of the boron may be filled by the identical or different hydrocarbon radicals. Representative, non-limiting examples of useful borine compounds include triethylboron, tri-n-butylboron, tri-sec.-butylboron, triisobutylboron, tricyclopentylboron, tricyclohexylboron, tristyrylboron, tri-α-methylstyrylboron, tricyclooctylboron, tricyclododecylboron, trinorbornylboron, etc.

In equation II, the oxidation of the organoboron intermediates to tertiary alcohols is shown. Typically, the oxidation is effected in a basic or alkaline system. Hence, the organoboron derivatives may be oxidized with alkaline hydrogen peroxide, or alkaline sodium hypochlorite, or with elemental oxygen or air in the presence of an alkali, such as an alkali metal hydroxide.

The instant reactions may be carried out in bulk, that is, in the absence of a solvent or in the presence of an inert organic solvent which does not enter into the reaction with the borine compounds or carbon monoxide under the conditions of the reaction. Examples of useful material include cyclohexane, cyclooctane, benzene, toluene, tetrahydrofuran, diglyme, etc. The ratio of the process reactants to solvent is not critical and may vary over a wide range as ordinarily only a sufficient quantity of solvent is used to insure a non-viscous reaction system. The reaction of the borine compound with the carbon monoxide is conducted at temperatures ranging from about 25° to 200° C., preferably between 100° and 150° C. and still more preferably between 100° and 125° C. The reaction pressure, that is the pressure maintained within the reaction zone, is maintained at a level below about 5 atmospheres. In most instances, reaction pressure will vary between 1 and 3 atmospheres. The length of the reaction period depends primarily upon the choice of process reactants. Optimum reaction times may vary in the range of from several minutes to three or more days. Ordinarily, the carbonylation reaction proceeds relatively rapidly. In most instances carbon monoxide uptake is completed at the above temperature and pressure conditions within about 10 hours. After the completion of CO uptake, the reaction product may be heated for from 1 to 10 hours at 100° to 175° C., preferably 125° to 150° C. to assure the migration of the organo groups.

It is particularly important that the reaction for the formation of the organoboron derivatives be conducted in the substantial absence of water and most desirably under anhydrous conditions. By the expression "in the substantial absence of water" is meant that less than about 0.50 mole of water per mole of organoboron compound is present in the reaction zone during the course of the reaction. As noted earlier, the presence of water within the reaction zone prevents the complete transfer of the organo groups from the organoboron compound to the carbon atom of the carbon monoxide reactant. Since it is necessary that water be excluded from the reaction zone measures should be taken to dry all of the process reactants and solvents, if employed, prior to use.

The reaction involving the oxidation of the instant organoboron derivatives to tertiary alcohols is normally achieved at temperatures ranging from −25° to 100° C., preferably from 25° to 75° C. at atmospheric pressure. Normally, substantial quantities of alcohol are secured at the above conditions in from 1 to 5 hours.

The compounds produced with the instant reactions have many varied uses. For example, the organoboron derivatives secured via the reaction of equation I may be used as such as gasoline and diesel oil additives. Alternatively, the organoboron derivatives may be oxidized, as described herein, to tertiary monoalcohols. These alcohols may be employed as solvents or as chemical intermediates.

DESCRIPTION OF THE PREFERRED EMBODIMENTS

The invention will be further understood by reference to the following examples.

EXAMPLE 1

One mole of tri-n-butylborane was placed within a one-liter reaction flask and heated to 125° C. Thereafter, carbon monoxide was introduced into the flask at 1-atmosphere pressure at a rate approximating the rate of absorption of the carbon monoxide. After carbon monoxide absorption had been completed, heating of the reaction mixture was continued for three hours. Thereafter, the intermediate organoboron derivatives were oxidized with alkaline hydrogen peroxide and an 80 percent yield of tri-n-butyl carbinol was isolated.

EXAMPLE 2

Into a dry 500 milliliter reaction flask equipped with a septum inlet, thermometer well, and magnetic stirrer (the flask was previously flushed with nitrogen) was introduced a solution of 2.84 grams (75 millimoles) of sodium borohydride contained in 150 milliliters of diglyme and 300 millimoles of 1-octene. The reaction flask was cooled and hydroboration (formation of the trialkyl borane compound) achieved by the dropwise addition of 27.4 milliliters (100 millimoles) of boron trifluoride diglymate into the system. The resulting solution was stirred at room temperature for about 1 hour. Thereafter, the temperature of the reaction vessel was increased to 125° C. and carbon monoxide introduced with stirring. After about 1 hour, carbon monoxide absorption was completed; however, the reaction temperature was maintained for 3 additional hours to insure complete transfer of the alkyl groups of the borine compound.

The flask was then cooled and 33 milliliters of 3N sodium hydroxide added followed by the dropwise addition of 33 milliliters of 30 percent hydrogen peroxide at 50° C. The reaction temperature was maintained at 50° C. for 3 additional hours to complete the oxidation of the organoboron derivative. The addition of 300 milliliters of water to the crude reaction product resulted in the separation of a 90 percent yield of tri-n-octyl-carbinol.

EXAMPLE 3

Employing the equipment and following the procedure of Example 2, trinorbornylboron was prepared by the reaction of 2.84 grams (75 millimoles) of sodium borohydride in 150 milliliters of diglyme, 28.3 grams (300 millimoles) of norbornene and 27.4 milliliters (100 millimoles) of boron trifluoride diglymate. To the reaction mixture, which contained trinorbornyl boron, was added 10 milliliters of ethylene glycol and the total solution heated to 100° C. The reactant system was then contacted with carbon monoxide with vigorous stirring. After about 1 hour, carbon monoxide absorption was complete. Thereafter, the reaction system was flushed with nitrogen and heated to 150° C. for 1 hour to insure migration of the alkyl groups. The flask was then immersed in an ice water bath and 33 milliliters of 6N sodium hydroxide was added followed by the dropwise addition of 33 milliliters of 30 percent hydrogen peroxide at a temperature just below 50° C. The solution was then heated to 50° for 3 hours to complete the oxidation. The addition of 300 milliliters of water to the cooled reaction product resulted in the precipitation of tri-2-norbornylcarbinol. The crude product was crystallized from pentane and there was obtained 25 grams (80 percent yield) of pure tri-2-norbornylcarbinol. The alcohol exhibited a melting point varying between 137° and 137.5° C.

EXAMPLE 4

Into a Parr hydrogenation bomb was placed 0.5 mole of tricyclopentylboron. The bomb was pressured to 4 atmospheres with carbon monoxide. Upon completion of the initial carbon monoxide pressurization, the reaction commenced and absorption of the carbon monoxide proceeded rapidly. The bomb was rocked during the course of the reaction and carbon monoxide was continuously introduced to maintain pressure at about 4 atmospheres. The absorption of carbon monoxide ceased with the uptake of about one mole of carbon monoxide. Upon completion of carbon monoxide absorption, the bomb temperature was raised to 150° C. and maintained at this level for 3 hours. Thereafter, the reactants were transferred to a flask and oxidized with alkaline hydrogen peroxide to tricyclopentylcarbinol.

EXAMPLE 5

Employing the equipment and following the procedure of Example 2, tri-sec.-butylcarbinol, triisobutylcarbinol and tricyclohexylcarbinol were prepared starting from tri-sec.-butyl borane, triisobutylborane and tricyclohexylborane. The carbonylation-oxidation reactions resulted in the formation of an 87 percent yield of the tri-secondary butyl carbinol, 90 percent yield of the trisiobutylcarbinol and 80 percent yield of the tricyclohexyl carbinol.

Having thus described the general nature and specific embodiments of the present invention, the true scope of the invention is now pointed out in the appended claims.

What is claimed is:

1. A process for the preparation of organoborane derivatives which comprises contacting an organoborane compound having the general formula $R_3B$, wherein R is selected from the group consisting of monovalent alkyl radicals and monovalent aralkyl radicals having from two to 30 carbon atoms, with carbon monoxide at a temperature of from about 25° C. to about 200° C. at a pressure of less than about 5 atmospheres, and less than about 0.5 mole of water per mole of organoborane being present for a time sufficient to recover an organoborane derivative having the general formula $(R_3CBO)_n$, where $n$ is 3.

2. The process of claim 1 wherein R is a monovalent alkyl radical having from two to 10 carbon atoms.

3. The process of claim 1 wherein said reaction is conducted at a temperature varying from about 100° to 150° C.

4. The process of claim 4 wherein said reaction is conducted at a pressure ranging from about 1 to 3 atmospheres.

5. The process of claim 1 wherein said reaction is conducted at a temperature in the range of from about 100° to 125° C. and at a pressure of about 1 atmosphere.

6. The process of claim 1 wherein said reaction is conducted with a molar excess of carbon dioxide per mole of organoborane compound.

7. The process of claim 1 wherein the contacting is carried out in the presence of an inert organic solvent.

8. The process for the preparation of organoborane derivatives which comprises contacting an organoborane compound having the general formula $R_3B$, wherein R is a monovalent alkyl radical having from two to 10 carbon atoms, with carbon monoxide at a temperature of from about 100° to 150° C., at a pressure ranging from about 1 to 3 atmospheres, in the presence of an inert organic solvent and less than about 0.5 mole of water per mole of organoborane being present for a time sufficient to recover an organoborane derivative having the general formula: $(R_3CBO)_3$.

* * * * *